United States Patent [19]

Roman

[11] 4,219,376

[45] Aug. 26, 1980

[54] FLEXIBLE ACOUSTICAL WALL COVERING, METHOD OF MAKING SAME, AND WALL PANEL EMPLOYING SAME

[75] Inventor: Charles A. Roman, Lake Hopatcong, N.J.

[73] Assignee: L. E. Carpenter & Company, Inc., Wharton, N.J.

[21] Appl. No.: 17,785

[22] Filed: Mar. 5, 1979

Related U.S. Application Data

[62] Division of Ser. No. 893,236, Apr. 4, 1978.

[51] Int. Cl.² .................. B32B 31/18; B32B 31/20
[52] U.S. Cl. ........................ 156/209; 156/252;
156/314; 156/315; 181/287; 181/293; 181/294;
427/412; 427/407.1; 428/132; 428/138;
428/141; 428/156; 428/161; 428/246; 428/261;
428/262; 428/265; 428/267; 428/518
[58] Field of Search .............. 52/144; 156/209, 219,
156/261, 250, 308, 324, 252, 314, 315; 181/287,
293, 294; 428/156, 171, 161, 132, 246, 254, 262,
264, 265, 267, 268, 141, 142, 518; 427/407 R, 412

[56] References Cited

U.S. PATENT DOCUMENTS

| | | | |
|---|---|---|---|
| 3,092,203 | 6/1963 | Slayter et al. | 428/442 |
| 3,354,022 | 11/1967 | Dettre et al. | 427/171 |
| 3,551,270 | 12/1970 | Sharkey | 156/252 |
| 3,666,610 | 5/1972 | Rosen | 52/144 |
| 3,712,846 | 1/1973 | Daniels et al. | 428/174 |
| 4,003,777 | 1/1977 | Eddy | 156/324 |
| 4,097,633 | 6/1978 | Focht | 156/209 |

Primary Examiner—George F. Lesmes
Assistant Examiner—R. E. Varndell
Attorney, Agent, or Firm—Reuben Wolk

[57] ABSTRACT

A flexible acoustical wall covering, method of making same, and wall panel employing same are provided wherein such wall covering is comprised of a laminated construction comprised of a substrate and an outer layer bonded against the substrate with the outer layer having a roughened outside surface defined by projections and indentations which serve as miniature sound baffles and a plurality of spaced openings in and disposed perpendicularly through the laminated construction which allow sound waves to pass therethrough with a fluid impervious film sealing the openings and enabling the wall covering to be used as a fluid impervious covering yet with the film allowing substantially unobstructed passage of the sound waves therethrough.

8 Claims, 6 Drawing Figures

U.S. Patent   Aug. 26, 1980   Sheet 1 of 2   4,219,376
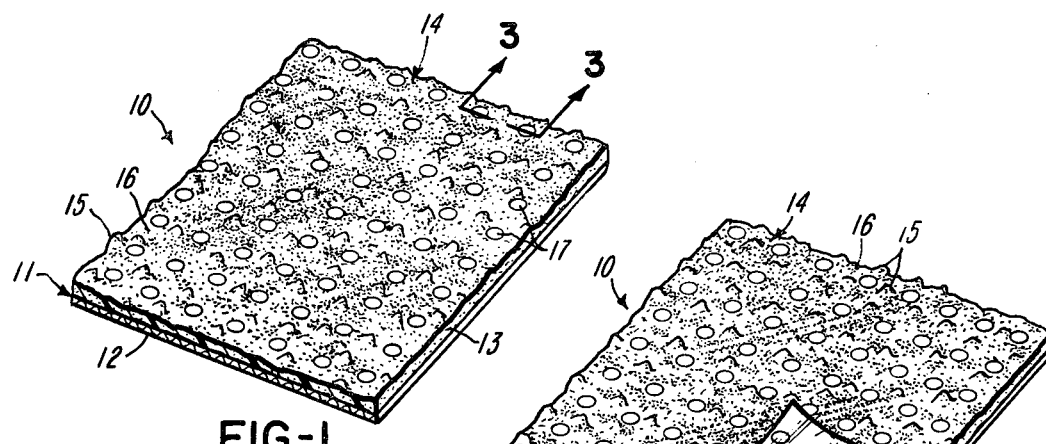
FIG-1
FIG-2
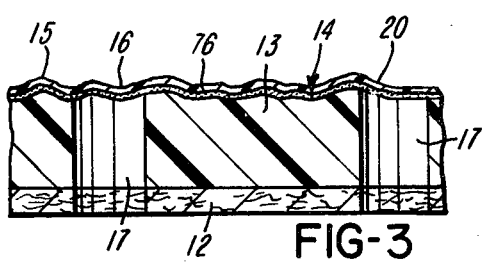
FIG-3
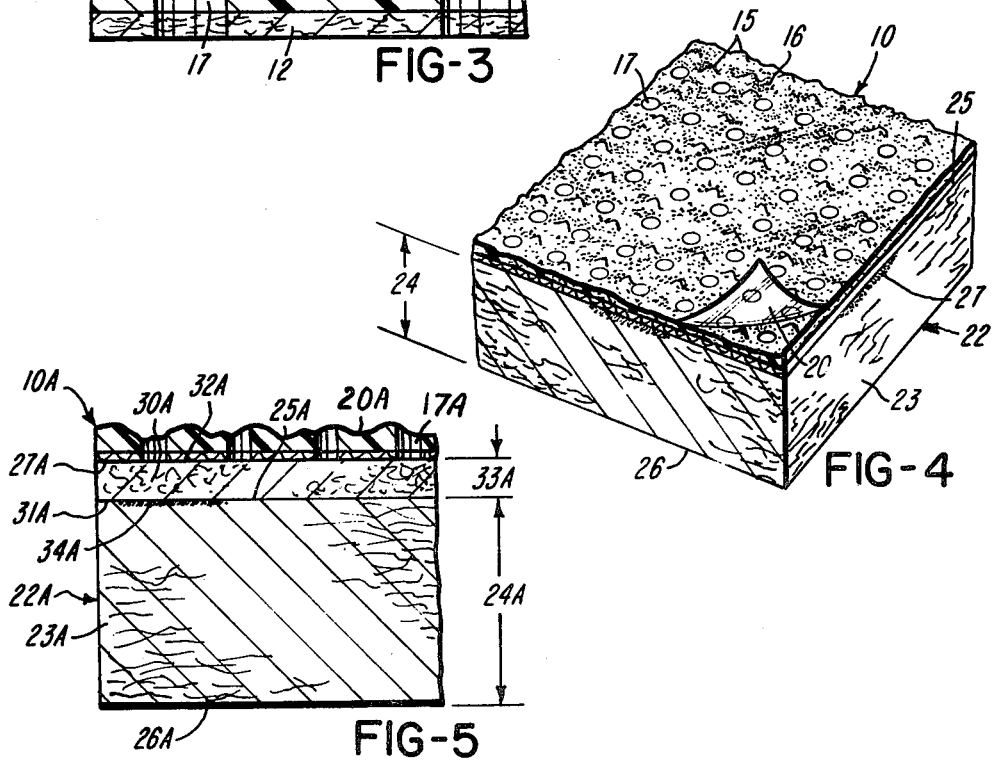
FIG-4
FIG-5

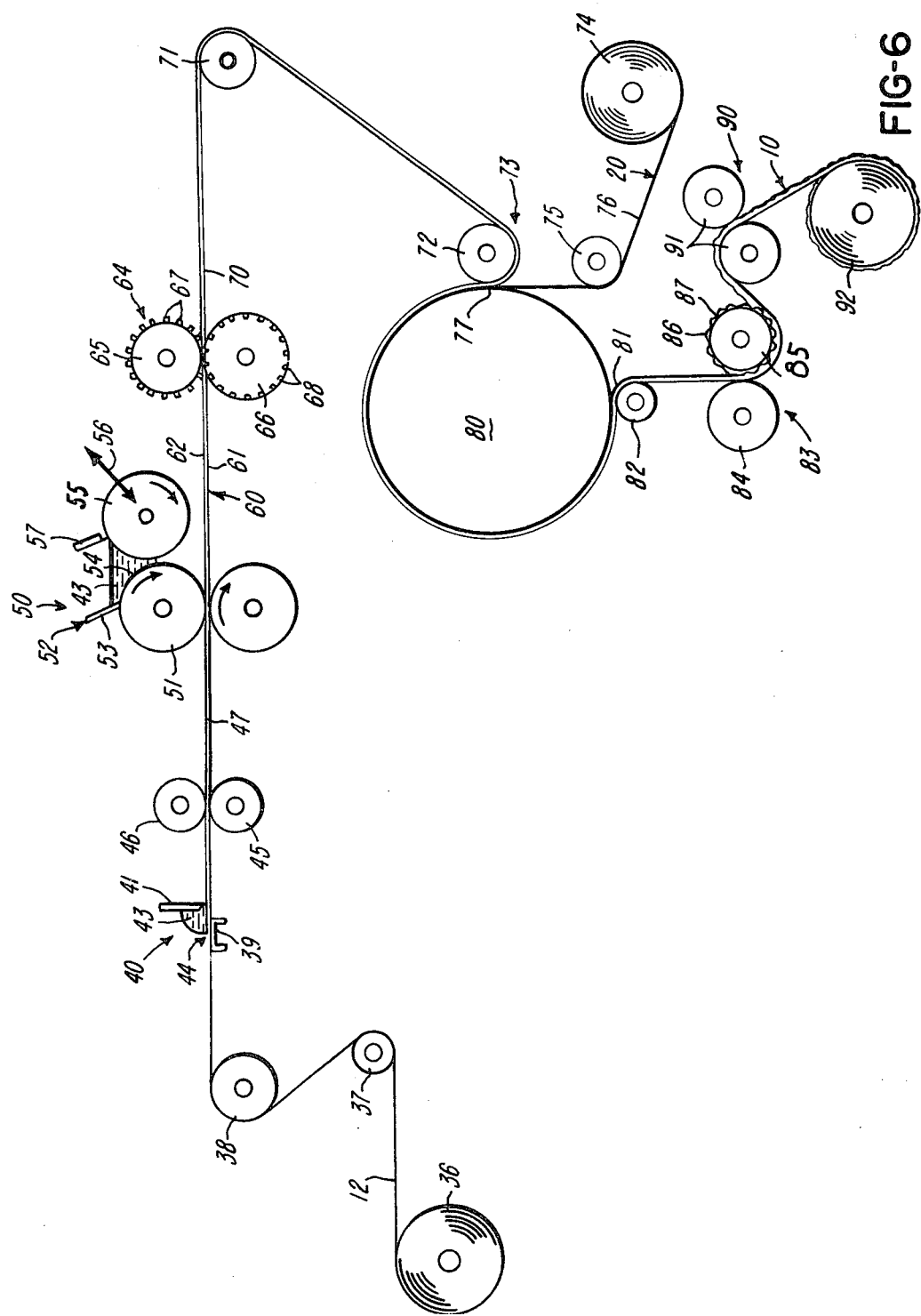

FLEXIBLE ACOUSTICAL WALL COVERING, METHOD OF MAKING SAME, AND WALL PANEL EMPLOYING SAME

This is a division of application Ser. No. 893,236 filed Apr. 4, 1978.

BACKGROUND OF THE INVENTION

It is known in the art to provide a flexible outer covering for an acoustical panel and a panel employing same wherein such flexible outer covering has a plurality of openings therethrough and a roughened or textured outside surface defined by projections and indentations which serve as miniature sound baffles and with the openings allowing passage of sound waves through the outer covering and as disclosed in U.S. Pat. No. 3,712,846. However, such a wall covering and acoustical panel employing same as disclosed in this patent are not usable in applications such as hospitals, instrument laboratories, computer facilities, food processing facilities and clean rooms of all types where it is required to maintain acoustical qualities of a wall covering and panel yet provide a washable, stainproof, fluid impervious wall covering which also assures that materials such as fiber glass often comprising an acoustical body disposed beneath the wall covering will not reverse flow through the openings.

It has also been proposed heretofore to provide wall coverings which have been protected with a polyvinyl fluoride film. However, it has not been known prior to this invention to provide an acoustical wall covering and panel employing same provided with openings therein and with fluid impervious film sealing the openings and enabling the wall covering to be used as an effective acoustical covering which is both washable on the outside and effectively isolates materials disposed therebeneath.

SUMMARY

It is a feature of this invention to provide a flexible acoustical wall covering which has the basic performance characteristics of a wall covering having openings therethrough yet wherein such openings are sealed to provide a fluid impervious wall covering.

Another feature of this invention is to provide in a flexible acoustical wall covering comprised of a laminated construction having a substrate and an outer layer bonded against the substrate with the outer layer having a roughened outside surface defined by projections and indentations serving as miniature sound baffles and a plurality of spaced openings therein and disposed perpendicularly through the laminated construction which allow sound waves to pass therethrough, the improvement comprising a fluid impervious film sealing the openings and enabling the wall covering to be used as a fluid impervious covering yet with the film allowing substantially unobstructed passage of the sound waves therethrough.

Another feature of this invention is to provide in a wall covering of the character mentioned the further improvement wherein the fluid impervious film is a stain-proof film made of polyvinyl fluoride and having a thickness that assures the unobstructed passage of sound waves therethrough.

Another feature of this invention is to provide an improved method of making a flexible acoustical wall covering of the character mentioned in a continuous uninterrupted process.

Another feature of this invention is to provide an acoustical wall panel employing an improved flexible acoustical wall covering of the character mentioned.

Therefore, it is an object of this invention to provide an improved flexible acoustical wall covering of the character mentioned, method of making same, and acoustical wall panel employing same having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which FIG. 1 is a fragmentary perspective view illustrating one exemplary embodiment of a flexible acoustical wall covering of this invention;

FIG. 2 is a fragmentary perspective view of a corner portion of the wall covering of FIG. 1 with parts of the component layers peeled upwardly and away from each other to highlight the construction of such wall covering;

FIG. 3 is a fragmentary cross-sectional view taken essentially on the line 3—3 of FIG. 1;

FIG. 4 is a fragmentary cross-sectional view illustrating one exemplary embodiment of an acoustical wall panel utilizing the wall covering of FIG. 1;

FIG. 5 is a view similar to FIG. 4 illustrating another exemplary embodiment of an acoustical wall panel utilizing the wall covering of FIG. 1; and FIG. 6 is a view in elevation with parts in cross-section, parts broken away, and parts shown schematically illustrating one exemplary embodiment of the method of this invention and apparatus associated therewith which is employed in making the exemplary wall covering of FIG. 1.

DETAILED DESCRIPTION

Reference is now made to FIG. 1 of the drawings which illustrates one exemplary embodiment of a flexible acoustical wall covering of this invention which is designated generally by the reference numeral 10 and such wall covering is particularly adapted to be used in applications where it is subjected to hard wear and where it is necessary to maintain the outside surface thereof clean by washing or the like. Typical applications for the wall covering 10 are hospitals, food processing centers, product testing laboratories, computer centers, instrument testing and calibration laboratories, and clean rooms of all types where it is necessary to maintain a clean controlled environment.

The wall covering 10 is comprised of a laminated construction which is designated generally by the reference numeral 11 and such laminated construction is comprised of a substrate 12 and an outer layer 13 bonded against the substrate with the outer layer having a roughened or textured outside surface indicated generally by the reference numeral 14. The roughened surface 14 is defined by projections 15 and indentations 16 which serve as miniature sound baffles. The wall covering 10 has a plurality of spaced openings 17 which extend through the laminated construction and are disposed substantially perpendicularly therethrough; and, the openings 17 are provided for the purpose of allowing sound waves to pass through such wall covering 10.

The wall covering 10 has a fluid impervious film 20 which seals the openings 17 in the laminated construction 11 and allows the wall covering 10 to be used as a fluid impervious wall covering yet the film 20 is such that it allows substantially unobstructed passage of sound waves through the laminated construction 11 and hence through the thickness of wall covering 10.

The substrate 12 of wall covering 10 may be made of any suitable material known in the art and such material may be woven material or a non-woven material. Further, such substrate may be made of natural fibers, synthetic fibers, or the like. However, regardless of the type of fibers used or how such substrate is made, the substrate is preferably of the order of a few ounces per square yard with a substrate thickness of roughly 4 to 6 mils.

The outer layer 13 of the laminated construction 11 may be made of any suitable vinyl material employed in the art and preferably is made of a vinyl plastisol in the form of polyvinyl chloride. The thickness of the outer layer 13 may vary so that it is generally of the order of 0.030 inch; however, such thickness is most applications may range roughly between 0.020 and 0.060 inch depending upon the desired appearance while in some applications such thickness may be greater. The exemplary thickness dimensions presented herein are the dimensions measuring the thickness over the outermost surfaces of the projections 15, and it is to be understood that those surface portions more closely adjacent the substrate and defining the indentations 16 will be of lesser thickness.

In this disclosure of the invention, only one exemplary type of wall covering surface has been shown; however, it is to be understood that any suitable type of roughened surface may be provided to define any desired texture. For example, the textured polymeric outer surface 14 of the outer layer 13 with its projections 15 and indentations 16 may define a wood grain effect, a fabric appearance of any desired simulated weave, or a decorative pattern of any type. Further, one or more colors may be employed whereby there is no limit of appearance that may be provided to the outer layer 13 and hence the overall appearance of the flexible acoustical wall covering of this invention.

The key to the provision of the wall covering 10 with its acoustical properties, washability, and capability of isolating wall structure disposed therebeneath is provision of a fluid inpervious film 20 which defines an exposed or outside surface for the outer layer 13 and hence the overall wall covering 10. The film 20 is preferably a stainproof film made of a synthetic plastic material and preferably such that it has a thickness of less than one mil. The preferred film is a film of polyvinyl fluoride (PVF) having a thickness of roughly one-half mil and the PVF film is disposed against the roughened outside surface 14 of the outer layer 13 to define film covered projections 15 and indentations 16. The PVF film serves as a thin film membrane over the openings 17 and because of the comparatively small thickness and properties of such PVF film, it has been found by tests that the acoustical properties of the covering 10 are substantially undiminished. Stated otherwise, the film allows substantially unobstructed passage of the sound waves through the openings 17 thus enabling permeating thereof into the acoustical material disposed therebeneath while the film covered projections 15 and indentations 16 continue to serve as miniature sound baffles.

Having described the wall covering 10 of this invention, reference is now made to FIG. 4 of the drawings which illustrates an exemplary acoustical wall panel employing the wall covering 10 of this invention and such wall panel is designated generally by the reference numeral 22. The wall panel 22 comprises a flat sheet like sound absorbing and insulating main body 23 of substantial thickness 24 which has a pair of opposed planar surfaces 25 and 26 and the main body 23 has a substantially uniform density throughout.

The wall covering 10 is suitably bonded against one of the planar surfaces, shown as a surface 25, and such bonding may be achieved utilizing any suitable technique or bonding means known in the art. In this example, a suitable adhesive 27 is provided for this purpose and such adhesive may be disposed between the covering 10 and main body 23 as a plurality of uniform spaced adhesive spots or the like. With the wall covering 10 of this invention bonded against the main body 23 sound waves as influenced by the miniature baffles defined by projections 15 and indentations 16 pass through the film 20 of such wall covering, through the spaced openings 17, and into the main body 23 resulting in an overall substantial sound insulating or sound deadening. However, due to the use of the wall covering 10 the outside surface of panel 22 defined by such covering is washable and fluid impervious.

Reference is now made to FIG. 5 of the drawings which illustrates another exemplary embodiment of an acoustical wall panel of this invention. The panel illustrated in FIG. 5 is very similar to the panel 22; therefore, such panel will be designated generally by the reference numeral 22A and representative parts of such panel which are similar to corresponding parts of the panel 22 will be designated in the drawings by the same reference numerals as in the panel 22 (whether or not such components are mentioned in the specification) followed by the letter designation "A" and not described in detail. Only those component parts of the panel 22A which are different from corresponding parts of the panel 22 will be designated by a new reference numeral also followed by the letter designation "A" and described in detail.

The panel 22A comprises a flat sheet like sound absorbing and insulating main body 23A of substantial thickness 24A and the body 23A has opposed planar surfaces 25A and 26A and is of substantially uniform density throughout. The panel 22A differs from the panel 22 in that it has at least one hard porous sheet like member 30A which has opposed planar surfaces 31A and 32A and also has a substantially uniform density throughout and the member 30A has a thickness 33A which is substantially less than the thickness 24A of the main body 23A. The member 30A has one of its planar surfaces 31A bonded to or against an associated planar surface, surface 25A in this example, of the main body 23A and it will be appreciated that the member 30A is an air pervious member which allows sound waves to be transmitted therethrough. The panel 22A has a flexible acoustical wall covering which is designated by the general reference numeral 10A and the wall covering 10A is substantially identical to the wall covering 10 comprising the wall panel 22 and as illustrated and described in connection with FIGS. 1 and 2 of the drawings. The wall covering 10A operates in a similar manner as described previously and the film 20A of such wall covering seals the openings 17A of the laminated construction 11A thereof and enables the wall covering 10A to be used as a fluid impervious washable covering of the acoustical panel 22A yet with the film 20A allowing substantially unobstructed passage of sound waves therethrough and into the member 30A and main body 23A.

The wall covering 10A may be suitably bonded to the member 30A using any technique known in the art and suitable adhesive means 27A may be provided either as a continuous film or as a plurality of spaced spots of adhesive to provide a bonding action. The member 30A may also be suitably bonded to the main body 23A utilizing adhesive means or adhesive spots indicated generally by the reference numeral 34A.

The main body 23 of panel 22 and the main body 23A of panel 22A may be made of any suitable acoustical or thermal insulating material known in the art. For example, each main body may be made of glass fibers or fiber glass having a density between 2 to 6 pounds per cubic foot and may have a thickness ranging between 1 to 6 inches or more. Similarly, the member 30A of the panel 22A may be made of fiber glass or the like and its density may range between 16 and 44 pounds per cubic foot and such member may have a thickness ranging between 1/16 to ¼ of an inch or more. Nevertheless, with these densities and thicknesses for the members 23, 23A and 30A it will be appreciated that these components serve both a structural and a second absorbing function.

It will also be appreciated that other embodiments of acoustical panels may be provided employing the unique wall covering of this invention on panels of the types illustrated in the previously mentioned U.S. Pat. No. 3,712,846. For details of panels disclosed in this patent, the contents of the disclosure of such patent are incorporated herein by reference thereto.

Having described the flexible acoustical wall covering 10 of this invention, reference is now made to FIG. 6 of the drawings for a detailed presentation of the method of this invention for making such wall covering in a continuous and substantially uninterrupted process. In disclosing the method, the various webs and materials defining component parts of the wall covering 10 will be designated by the same reference numerals as in the final or completed covering and this has been achieved for ease of presentation.

In making the wall covering 10, a substrate 12 is provided as a web thereof on a supply roll 36 which is supported for unwinding rotation. The web 12 is then moved around a web tensioning roller 37 which is suitably supported for movement to provide the required tension in such web and around a backing roller 38 and over a backup shoe 39 at a sealing station 40.

A floating knife assembly 41 is provided at station 40 and serves in the manner of a doctor blade, or the like, to provide what amounts to a seal coat or thickness of a suitable plastisol or other material which comprises layer 13 and the plastisol will be designated by the reference numeral 43 and is provided upstream of the knife assembly 41 at 44. The sealed substrate 12 is then moved between a pair of cooperating rollers comprised of yieldable backing roller 45 and a top roller 46 having a hard metal surface which compresses the plastisol 43 into the substrate 12 to define a laminated construction.

The construction 47 moves from the sealing station 40 to what will be referred to as a coating station 50 where it is coated by a reverse roll coating method or technique as will now be described in detail. The reverse roll method employed at the coating station 50 enables the construction 47 to be coated with an additional amount or thickness of liquid vinyl plastisol, also designated by the reference numeral 43, and the coating action is produced by coating a transfer roller 51 with plastisol 43 by rotating such roller through a plastisol filled reservoir 52 defined by a liquid containing wall structure 53 which cooperates with the circumferential surface 54 of the roller 51. The coating action is achieved with the peripheral surface of the roller 51 moving in a direction opposite the direction of the movement of the construction 47.

The amount of liquid vinyl plastisol 43 provided on the surface of the roller 51 before it contacts or engages the construction 47 is controlled employing what is commonly referred to as a metering roller 55. The metering roller 55 is adjustable by a suitable adjusting mechanism indicated schematically by a double arrow 56 to provide a controlled gap between the rollers 55 and 51. A suitable doctor blade 57 is provided and operatively associates with the roller 55 to prevent excessive accumulation of the vinyl plastisol 43 thereon. The coating roller 51 coats the vinyl plastisol layer to provide a controlled thickness thereof and thereby define a laminated construction which is designated by the reference numeral 60 and construction 60 has opposed planar surfaces 61 and 62.

The reverse roll coating of the vinyl plastisol 43 at the station 50, in essence, results in increasing the thickness of the vinyl plastisol on the substrate 12 as provided at the sealing station 40 to the total thickness required to define the outer layer 13 in the completed wall covering 10. Ordinarily the sealing station results in the application of vinyl plastisol in sufficient amount to provide a sealing of the interstices in the substrate 12 and generally the amount employed results in the weight of the coating being generally of the order of 5 ounces per square yard. The application of vinyl plastisol at the coating station 50 results in increasing the weight of vinyl plastisol from the 5 ounces per square yard to generally of the order of 20 ounces per square yard.

The utilization of a two step technique resulting in sealing of the substrate 12 at the sealing station 40 and the application of more vinyl plastisol at the coating station 50 defines a more precisely controlled thickness of vinyl plastisol enabling provision of a wall covering which closely approximates the weight, appearance, and texture of any desired wall covering on the market. However, it is to be understood that the application of vinyl plastisol may be achieved at a single station either 40 or 50 with the net result being the provision of laminated construction 60 comprised of the substrate 12 and layer 13 with laminated construction 60 having the opposed planar surfaces 61 and 62 as previously mentioned.

The laminated construction 60 is then continuously moved to a punching station 64 where a pair of cooperating rollers 65 and 66 punch the plurality of spaced openings 17 in the laminated construction with such openings extending substantially perpendicular to the opposed surfaces 61 and 62 of the construction 60. One of the rollers such as the roller 65 has a plurality of male punching members 67 extending from the peripheral surface thereof and members 67 cooperate with cooperating die members 68 comprising the roller 66 so that each punching member 67 is received within a cooperating aperature of a cooperating die member 68 to sever an associated opening 17 therethrough. The laminated construction 60 has the openings 17 cut completely therethrough with precisely defined cut edges resulting in a perforated laminated construction or perforated multiple ply web 70. The perforated web defined at station 64 has an open area which may range between 5 and 30 percent and preferably the perforated area ranges between 15 and 25 percent with the optimum area being generally of the order of 18 percent.

The construction 70 exits the punching station 64 and such construction moves around a turn roller 71 and from roller 71 around what will be referred to as a bonding roller 72 at a bonding station 73 for bonding of a suitable stainproof film 20 thereagainst. The stainproof film 20 is provided as a web also designated by the reference numeral 20 which is supplied on a supply roll 74 thereof and roll 74 is suitably supported for unwinding rotation. The web of film preferably has a thickness of less than one mil and it has been found that such film preferably is of one-half mil thick, i.e., 0.0005 inch thick. The film 20 is moved around a combination lead-in and turn roll 75 and such film preferably has a suitable adhesive means or adhesive 76 defining an exposed surface thereof. The adhesive 76 is provided on the film using any suitable technique and in this example is a suitable solid non-adhering material which is preferably a heat-sealable adhesive 76 and bonds the film 20 to the perforated web 70 at the bonding station 73. It will also be appreciated that the adhesive 76 may be suitably applied on film 20 as a liquid coat at a location upstream of the bonding station 73.

The bonding station 73 is in essence defined by the roller 72 previously described and a surface portion 77 of a laminator drum 80. The drum 80 is of substantial diameter as compared to the roller 72 and is maintained at a controlled temperature compatible with the materials comprising the perforated web 70, the film 20, and the adhesive 76. The substantial diameter of drum 80 and the controlled temperature thereof assures tenacious bonding or lamination of the film 20 to the perforated web 70 during continuous movement thereof and the diameter may be selected to assure provision of an adequate bonding time.

In one example of the method of making the wall covering of this invention wherein the substrate 12 was a cotton scrim material, the layer 13 was a layer of polyvinyl chloride, the film 20 was a web of polyvinyl fluoride having a thickness of one-half mil thickness, and the adhesive 76 was a vinyl plastisol adhesive provided on the film 20, the drum was maintained at a temperature generally of the order of 320°-330° F. which may be considered at a laminating temperature of roughly 325° F.

The laminated construction which exits the drum 80 is designated by the reference numeral 81 and such construction is then moved around a turn roller 82 into an embossing station indicated generally by the reference numeral 83. At the embossing station 83 a back up roller 84 and a cooperating embossing roller 85 are provided. The back up roller 84 has a smooth surface so that the exposed surface of the substrate 12 and hence the inside surface of the wall covering 10 is maintained with a substantially smooth inside surface. The embossing roller 85 has suitable projections 86 and indentations 87 provided thereon which provide the desired pattern in the outer layer comprising the laminated construction; and, in this example of the invention the projections 86 and indentations 87 provided on the embossing roller 85 define corresponding indentations 16 and projections 15 and hence the textured outside surface 14 of the wall covering 10. It will be appreciated that the surface of the embossing roller 85 with its projections 86 and indentations 87 may be varied to define any desired textured or roughened surface for a wall covering and in accordance with techniques which are known in the art.

The embossed construction which leaves embossing station 83 is basically a hot or uncooled wall covering 10 which has a roughened or textured configuration in the outer layer 13 thereof. The projections 15 and indentations 16 thereof serve as miniature sound baffles and the film 20 fills the openings 17 to enable the wall covering 10 to be used as a fluid impervious covering yet with the film 20 allowing substantially unobstructed passage of sound waves therethrough in the manner previously described. During the embossing action at the embossing station 83 the projections 86 and indentations 87 in the embossing roller 85 do not sever or damage the film 20 but instead define the contoured or textured configuration in such film which corresponds to the configuration of the layer 13 as defined by the overall embossing roller. With this construction it will be appreciated that the exposed surface of the wall covering 10 is, in essence, a cleanable or washable surface yet with the holes or openings 17 therethrough providing the desired acoustical effect.

After movement of the hot wall covering 10 out of the embossing station 83 it moves through a cooling station 90 where it is cooled by a pair of cooperating cooling rollers each designated by the same reference numeral 91. The now cooled wall covering 10 is then wound in coil form to define a supply roll 92 thereof. The film 20 comprising the wall covering 10 is preferably polyvinyl fluoride as previously mentioned and an example of such film which has been satisfactorily employed is made by the E. I. DuPont de Nemours and Co., Inc., of Wilmington, Delaware 19898 and sold under the trade designation of "Tedlar".

As indicated previously, the laminated construction 60 is punched at the punching station 64 by a pair of cooperating rollers 65 and 66 to define spaced openings 17 therein. Each opening 17 may be of any suitable cross-sectional configuration and preferably each opening is a circular opening which may range in diameter between 0.032 inch and 0.045 inch.

In the disclosure of the method of this invention as presented in FIG. 6 of the drawings supports for the various components, drive systems, power sources, control devices, and the like have not been illustrated or described. However, it will be appreciated that these and similar items are provided as required and employed in accordance with techniques known in the art.

While present exemplary embodiments of this invention, and methods of practicing the same, have been illustrated and described, it will be recognized that this invention may be otherwise variously embodied and practiced within the scope of the following claims.

What is claimed is:

1. A method of making flexible fluid impervious acoustical wall covering in a continuous uninterrupted manner comprising the steps of, coating a substrate with a layer of plastisol to define a laminated construction having opposed planar surfaces, punching a plurality of spaced openings through said laminated construction substantially perpendicular to said opposed planar surfaces, supporting a supply roll of a web of fluid impervious film adjacent said laminated construction, bonding said fluid impervious film from said supply roll against an entire exposed surface of said laminated construction, and embossing said plastisol layer with said film against said entire exposed surface area yet still maintaining the fluid impervious character of said film throughout its entire surface area, said embossing step defining a roughened configuration in said layer having projections and indentations which serve as miniature sound baffles, said film sealing said openings and enabling said wall covering to be used as a fluid impervious covering yet with said film allowing substantially unobstructed passage of sound waves therethrough.

2. A method as set forth in claim 1 in which said bonding step comprises disposing an adhesive between said film and laminated construction to enable bonding in a tenacious manner.

3. A method as set forth in claim 1 in which said bonding step comprises passing said film consisting of polyvinyl fluoride between a bonding roller and a laminator drum to engage said film against said entire exposed surface area of said laminated construction, said film having a thickness generally of the order of ½ mil, and rotating said laminator drum with said film and laminated construction in contact with each other.

4. A method as set forth in claim 3 in which said bonding step comprises bonding said film against said entire exposed surface area defined by the entire exposed surface area of said plastisol layer, and said embossing step comprises defining said roughened configuration in said layer and simultaneously therewith defining the same roughened configuration in said film disposed outwardly thereof.

5. A method as set forth in claim 4 in which said bonding step comprises continuously bonding said laminated construction and film on said laminator drum during said rotating thereof while at a temperature generally of the order of 325° F.

6. A method as set forth in claim 1 in which said coating step comprises first sealing said substrate with plastisol and then reverse roll coating an additional thickness of said plastisol on said sealed substrate to define said layer of plastisol.

7. A method as set forth in claim 6 in which said punching step comprises punching said laminated construction employing a first roller having a plurality of male punching members and a second roller having a corresponding plurality of cooperating die members.

8. A method as set forth in claim 7 in which said punching step comprises punching circular openings each having a diameter ranging between 0.032 and 0.045 inch and wherein said punching step defines an open area in said laminated construction ranging between 5 and 30 percent.

* * * * *